US012376519B2

(12) United States Patent
Teach

(10) Patent No.: US 12,376,519 B2
(45) Date of Patent: Aug. 5, 2025

(54) QUICK CHANGE BLADE FOR A ROTATING BLADE ASSEMBLY OF A MOWER IMPLEMENT

(71) Applicant: DEERE & COMPANY, Moline, IL (US)

(72) Inventor: Kyle R. Teach, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 651 days.

(21) Appl. No.: 17/806,771

(22) Filed: Jun. 14, 2022

(65) Prior Publication Data

US 2023/0397529 A1 Dec. 14, 2023

(51) Int. Cl.
*A01D 34/73* (2006.01)

(52) U.S. Cl.
CPC .................... *A01D 34/733* (2013.01)

(58) Field of Classification Search
CPC .. A01D 34/733; A01D 34/736; A01D 34/535; A01D 34/664; A01D 34/665; A01D 1/08; A01D 34/63
USPC ............................ 56/295, 255, 12.7; 172/123
See application file for complete search history.

(56) References Cited

U.S. PATENT DOCUMENTS

| | | | | |
|---|---|---|---|---|
| 3,152,432 A * | 10/1964 | Scarnato | ................ | A01D 34/63 56/295 |
| 3,507,104 A * | 4/1970 | Kline | ................... | A01D 34/733 56/295 |
| 4,778,012 A * | 10/1988 | Kobashi | ............... | A01B 33/103 172/123 |
| 4,815,264 A | 3/1989 | Mijnders | | |
| 10,117,379 B2 * | 11/2018 | Guiet | ................... | A01D 34/736 |
| 10,426,082 B1 * | 10/2019 | Dallman | .............. | A01D 34/736 |
| 2005/0016150 A1 | 1/2005 | Thompson et al. | | |
| 2006/0213170 A1* | 9/2006 | Barnett | ................ | A01D 34/664 56/295 |
| 2009/0205305 A1 | 8/2009 | Koorn | | |

(Continued)

FOREIGN PATENT DOCUMENTS

| | | | | |
|---|---|---|---|---|
| GB | 2061687 A | * | 5/1981 | .......... A01D 34/736 |
| JP | 2020162506 A | | 10/2020 | |
| WO | WO-9918769 A1 | * | 4/1999 | .......... A01D 34/736 |

OTHER PUBLICATIONS

Extended European Search Report and Written Opinion issued in European Patent Application No. 23178931.4 dated Mar. 26, 2024, in 08 pages.

*Primary Examiner* — Joseph M Rocca
*Assistant Examiner* — Sunny D Webb

(57) ABSTRACT

A blade for a rotating blade assembly for a mower implement is positioned between a disc and a spring plate. The blade includes a body defining a pin aperture. A retaining pin includes a shaft portion that defines a shaft diameter and extends through the pin aperture of the blade. The retaining pin is engaged with a mounting aperture of the disc and a pocket of the spring plate. The body of the blade includes a radially inner edge relative to a rotation axis of the disc. The body defines a tail length between the pin aperture and the radial inner edge. The tail length is equal to or greater than seventy five percent of the shaft diameter of the shaft portion of the retaining pin and/or the pin aperture of the blade. The pin aperture of the blade is less than 105% the shaft diameter of the retaining pin.

10 Claims, 6 Drawing Sheets

(56) References Cited

U.S. PATENT DOCUMENTS

| | | | |
|---|---|---|---|
| 2010/0101201 A1* | 4/2010 | Yanke | A01D 34/736 56/295 |
| 2013/0055546 A1* | 3/2013 | Fay, II | A01D 34/736 29/525.01 |
| 2013/0111863 A1 | 5/2013 | Johnson et al. | |
| 2020/0352095 A1 | 11/2020 | Jerez | |

* cited by examiner

QUICK CHANGE BLADE FOR A ROTATING BLADE ASSEMBLY OF A MOWER IMPLEMENT

TECHNICAL FIELD

The disclosure generally relates to a rotating blade assembly for a mower implement, and more particularly to a cutter blade of the rotating blade assembly.

BACKGROUND

A cutter bar style mower implement includes a cutter bar having a plurality of rotating blade assemblies attached thereto. The cutter bar includes a drive for rotating the blade assemblies. The drive rotates each respective rotating blade assembly about a respective rotation axis for cutting crop material.

Each blade assembly may include a disc that is attached to and driven or rotated by the drive. The disc extends radially outward from the respective rotation axis to a radially outer disc edge. One or more blades may be attached to the disc proximate the radially outer disc edge. Each blade may be rotatably attached to the disc to allow free rotational movement of the blade relative to the disc. Centrifugal force during operation causes the blade to extend radially outward from the rotation axis. However, the rotatable connection between the blade and the disc enables the blade to deflect or rotate relative to the disc when an object, e.g., a rock or a stump, is encountered.

The blades are a wear item, which require occasional replacement. In order to enable easy replacement of the blades, the rotating blade assembly may be configured with a quick attach blade system. For example, the rotating blade assembly may include a spring plate coupled to the disc, with the blade positioned between the disc and the spring plate. The spring plate extends radially outward from respective rotation axis of the disc to a radially outer plate edge. A retaining bolt may be attached to the disc, and include a distal end engaged within a pocket of the spring plate. The retaining pin extends between both the disc and the spring plate. The retaining bolt includes a shaft portion that passes through a pin aperture of a respective blade. The blade may rotate about the shaft portion, with the retaining pin securing the blade relative to the disc and the spring plate.

The spring plate provides a spring force biased toward the disc, such that the spring plate presses against the distal end of the retaining pin, thereby capturing the retaining pin between the disc and the spring plate. A specialized tool may be positioned between the spring plate and the disc and used as a lever to deflect the spring plate away from the disc and disengage the spring plate from the distal end of the retaining pin, thereby providing space between the spring plate and the distal end of the retaining pin and allowing a worn blade to be removed and a new blade to be installed.

The blade defines a tail length measured between a radially inner edge of the blade and the pin aperture. The tail length may be measured along a central longitudinal axis of the blade, between the radially inner edge or end of the blade and a circumferential edge of the pin aperture positioned nearest the radially inner edge. In prior art blades of such quick attach blade systems, the tail length of the blade is equal to or less than substantially and/or approximately 65% of the shaft diameter of the retaining pin. Additionally, In prior art blades of such quick attach blade systems, the clearance between the shaft portion of the retaining pin and the pin aperture of the blade is substantially and/or approximately equal to twelve prevent (12%) of the shaft diameter of the retaining pin.

SUMMARY

A rotating blade assembly for a mower implement is provided. The rotating blade assembly includes a disc defining a rotation axis. The disc extends radially outward away from the rotation axis to a radially outer disc edge. The disc defines a mounting aperture proximate the radially outer disc edge. A spring plate is coupled to the disc proximate the rotation axis. The spring plate extends radially outward away from the rotation axis to a radially outer plate edge. The spring plate defines a pocket aligned with the mounting aperture. A blade is positioned between the disc and the spring plate. The blade includes a body defining a pin aperture. A retaining pin includes a shaft portion that defines a shaft diameter and extends through the pin aperture of the blade. The retaining pin is engaged with the mounting aperture of the disc and the pocket of the spring plate. The spring plate is configured to exhibit a bias force at the pocket in a direction toward the disc to capture the blade between the disc and the spring plate. The body of the blade includes a radially inner edge relative to the rotation axis. The body defines a tail length between the pin aperture and the radial inner edge. The tail length is equal to or greater than seventy five percent (75%) of the shaft diameter of the shaft portion of the retaining pin.

In one aspect of the disclosure, the tail length may be defined as the minimum distance between a circumferential edge of the pin aperture and the radially inner edge of the body of the blade. The radially inner edge of the body of the blade may be defined as an axial end or longitudinal extent of the body of the blade measured along a central longitudinal axis of the blade.

As noted above, the tail length is equal to or greater than seventy five percent (75%) of the shaft diameter of the shaft portion of the retaining pin. In one aspect of the disclosure, the tail length may be larger than the shaft diameter. In one particular implementation, the tail length is approximately and/or substantially zero point five percent (0.5%) larger than the shaft diameter of the shaft portion of the retaining pin.

In one aspect of the disclosure, the pin aperture defines a hole diameter that is larger than the shaft diameter of the shaft portion of the retaining pin. In one implementation of the disclosure, the hole diameter of the pin aperture is less than one hundred ten percent (110%) of the shaft diameter of the shaft portion of the retaining pin. In other words, the hole diameter of the pin aperture is less than one point one (1.1) times the shaft diameter of the shaft portion of the retaining pin. In one particular implementation, the hole diameter of the pin aperture is less than one hundred five percent (105%) of the shaft diameter of the shaft portion of the retaining pin. In other words, the hole diameter of the pin aperture is greater than the shaft diameter of the shaft portion of the retaining pin and less than one point zero five (1.05) times the shaft diameter of the shaft portion of the retaining pin.

In one aspect of the disclosure, the retaining pin may include a flange extending radially outward away from the shaft portion of the retaining pin. The flange defines a flange diameter that is greater than the shaft diameter, but less than the hole diameter of the pin aperture. In one implementation, the flange diameter is larger than the shaft diameter of the shaft portion of the retaining pin, and approximately and/or substantially less than one hundred five percent (105%) of the shaft diameter.

A blade for a rotating blade assembly of a mower implement is also provided. The blade includes a body including a radially inner edge and defining a pin aperture extending through the body. The pin aperture defines a hole diameter. The pin aperture is spaced from the radially inner edge by a tail length. The tail length is approximately and/or substantially equal to or greater than seventy five percent (75%) of the hole diameter of the pin aperture.

In one aspect of the disclosure, the tail length may be larger than the hole diameter of the pin aperture. In one particular implementation, the tail length is approximately and/or substantially equal to zero point five percent (0.5%) larger than the hole diameter of the pin aperture.

Accordingly, the blade for the rotating blade assembly of the mower implement, as described herein, increases resistance to being dislodged from the retaining pin when compared to a previously configured blade having a shorter tail length. It was previously believed that the tail length of such blades should be minimized to reduce leverage of the blade against the spring plate in response to a force imparted on the blade in a direction parallel to the rotation axis, e.g., generally and upward vertical force. However, Applicants have discovered that the greatest resistance against dislodgement of the blade from the retaining pin may be achieved with a longer tail length than previously thought desirable. This is because the longer tail length of the blade described herein, in response to a force applied to the blade in the direction of the rotation axis, positions contact between the blade and the spring plate nearer the rotation axis, which reduces a bending moment imparted into the spring plate by the blade. Additionally, the longer tail length of the blade described herein requires the blade to swing through a longer pivot arc to separate the spring plate from the disc far enough for the longer tail length to be dislodged from the retaining pin. Additionally, tighter tolerances between the retaining pin and the pin aperture of the blade reduce the freedom of movement of the blade relative to the retaining pin. When the tail length, retaining pin, and pin aperture are sized according the disclosure herein, the blade will yield, i.e., bend, prior to the spring plate flexing away from the disc and allowing the blade to dislodge from the retaining pin. Accordingly, the blade configured according to the teachings described herein yields in response to a force applied in the direction of the rotation axis prior to flexing the spring plate away from the disc a distance sufficient to allow the blade to become dislodged from the retaining pin. As such, the blade configured according to the teachings described herein provides a higher resistance to dislodgement from the spring plate without changing the stiffness of the spring plate and/or other components of the rotating blade assembly. Because the stiffness or spring constant of the spring plate may remain the same as prior art rotating blade assemblies, the same removal tool that was previously used to leverage the spring plate away from the disc may still be used, with the same required force, to change/replace the blade from the rotating blade assembly. Additionally, the increased resistance against the blade becoming disengaged from the retaining pin may enable larger and/or heavier blades than previously possible.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Figure 1:
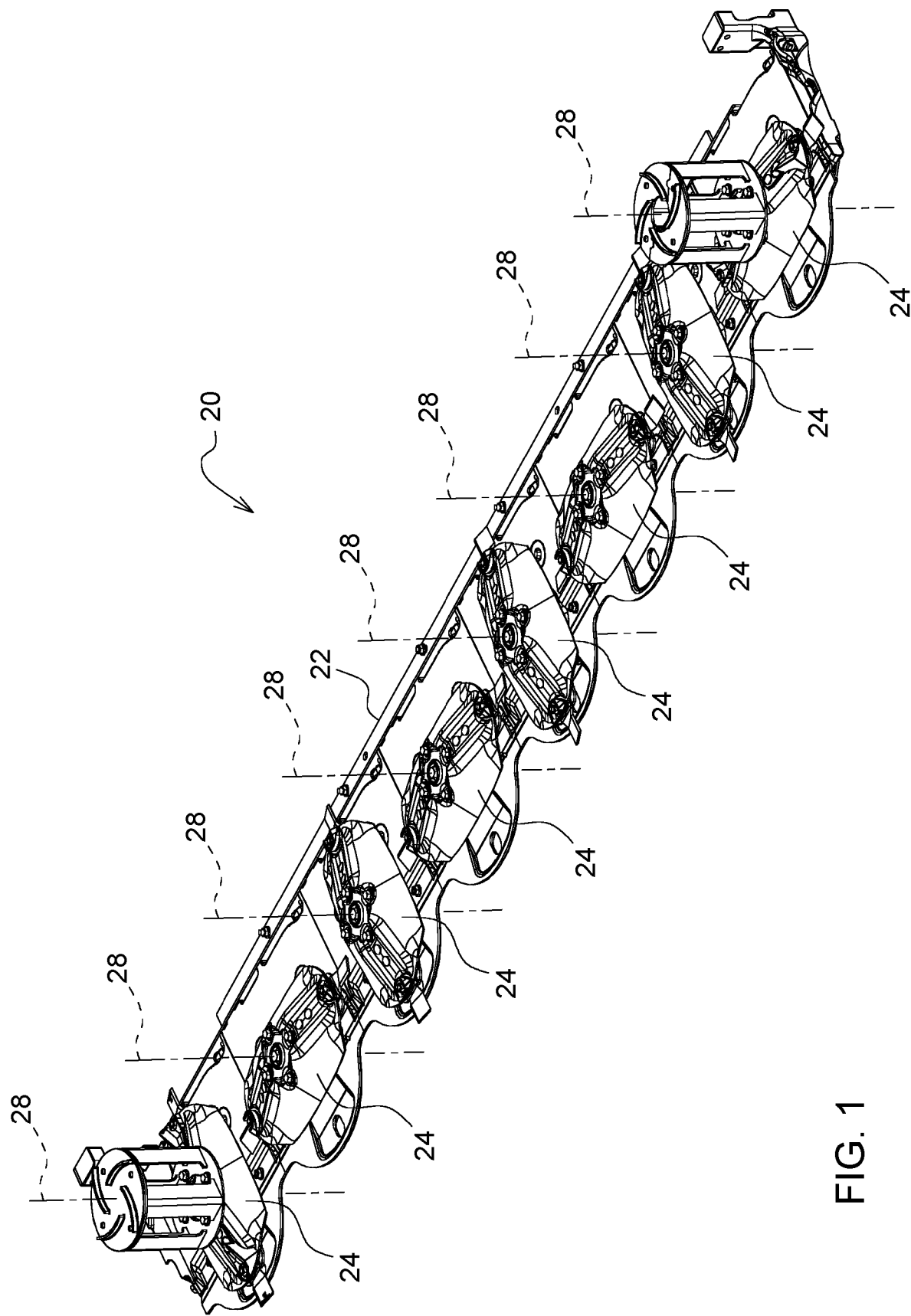
FIG. 1 is a schematic perspective view of a mower implement.

Referring to the Figures, wherein like numerals indicate like parts throughout the several views, a mower implement is generally shown at 20 in FIG. 1. The example implementation of the mower implement 20 shown in the Figures and described herein is configured to be attached to and powered by a traction unit, such as but not limited to a tractor or other similar vehicle. However, in other implementations, the mower implement 20 may be integrated with the traction unit, i.e., a self-propelled mower implement 20.

The mower implement 20 includes a cutter bar 22 having a plurality of rotating blade assemblies 24 attached thereto. The cutter bar 22 includes a drive mechanism 26 for rotating the blade assemblies 24. The drive mechanism 26 rotates each respective rotating blade assembly 24 about a respective rotation axis 28 for cutting crop material, such as but not limited to, hay, alfalfa, grasses, etc. The components, features, and operation of the cutter bar 22 and the drive mechanism 26 that rotates each of the respective rotating blade assemblies 24 is understood by those skilled in the art, is not pertinent to the teachings of his disclosure, and therefore not described in greater detail herein.

Figure 2:
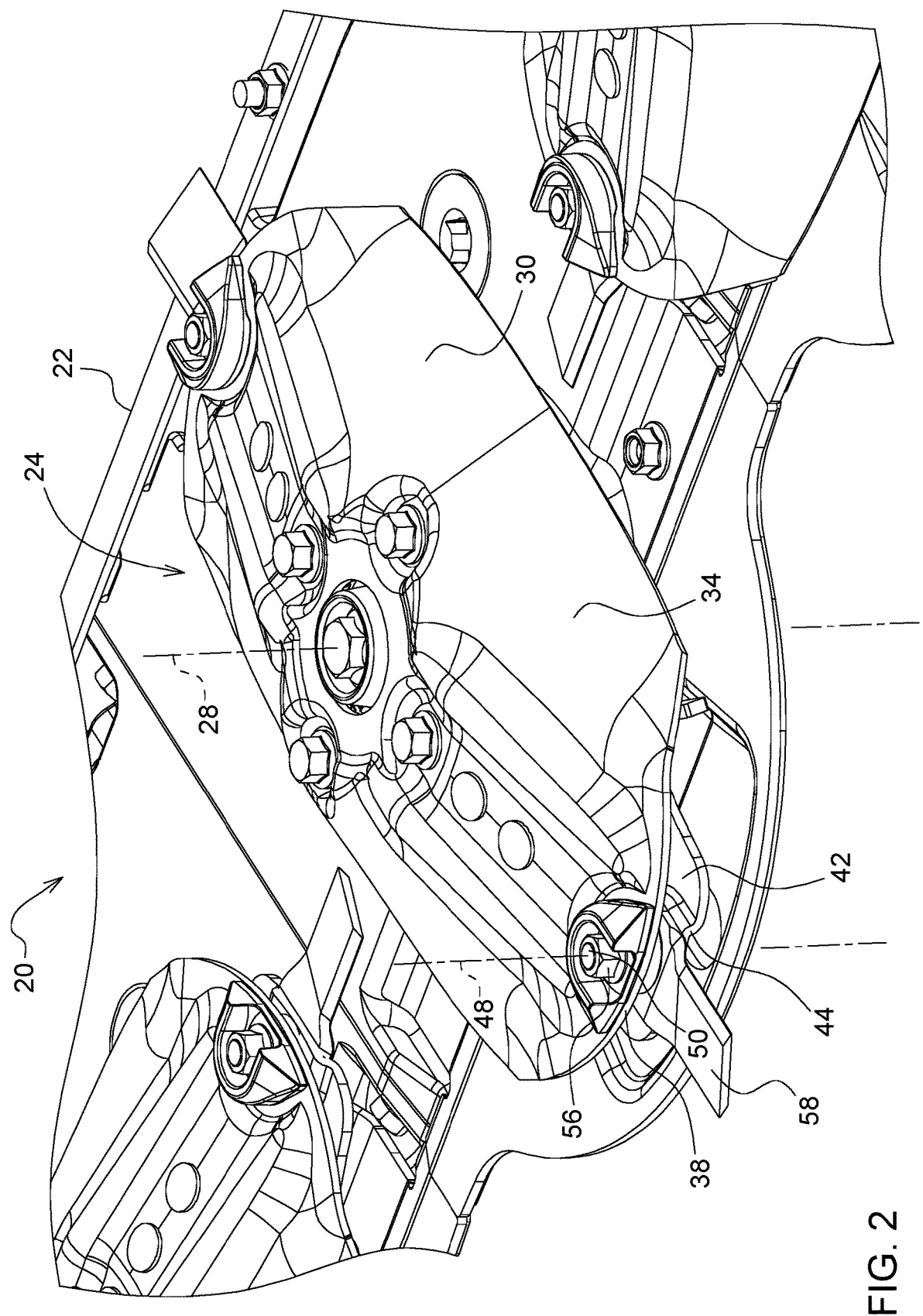
FIG. 2 is a schematic perspective view of a rotating blade assembly of the mower implement.
Figure 3:
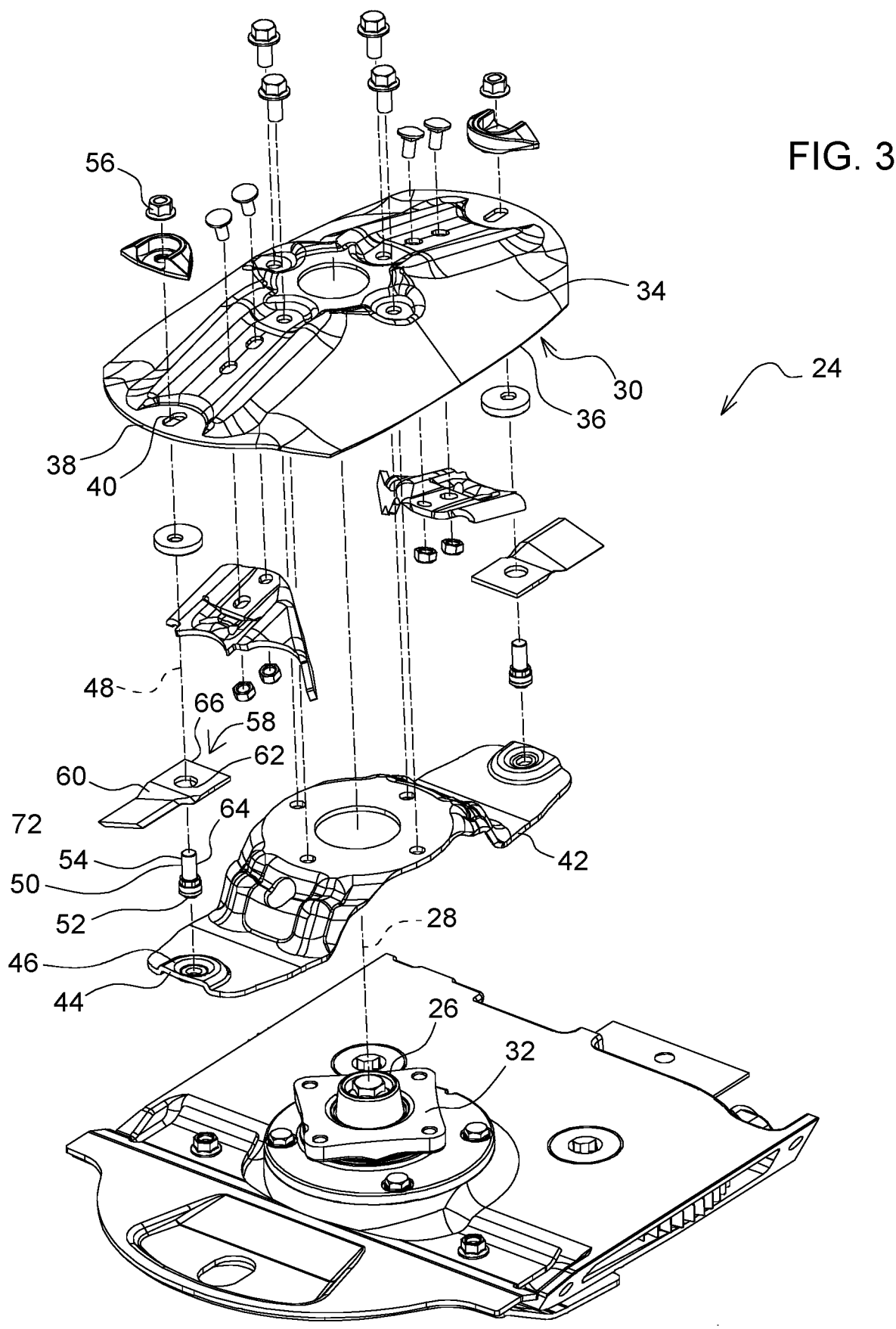
FIG. 3 is a schematic exploded perspective view of the rotating blade assembly.
Figure 4:
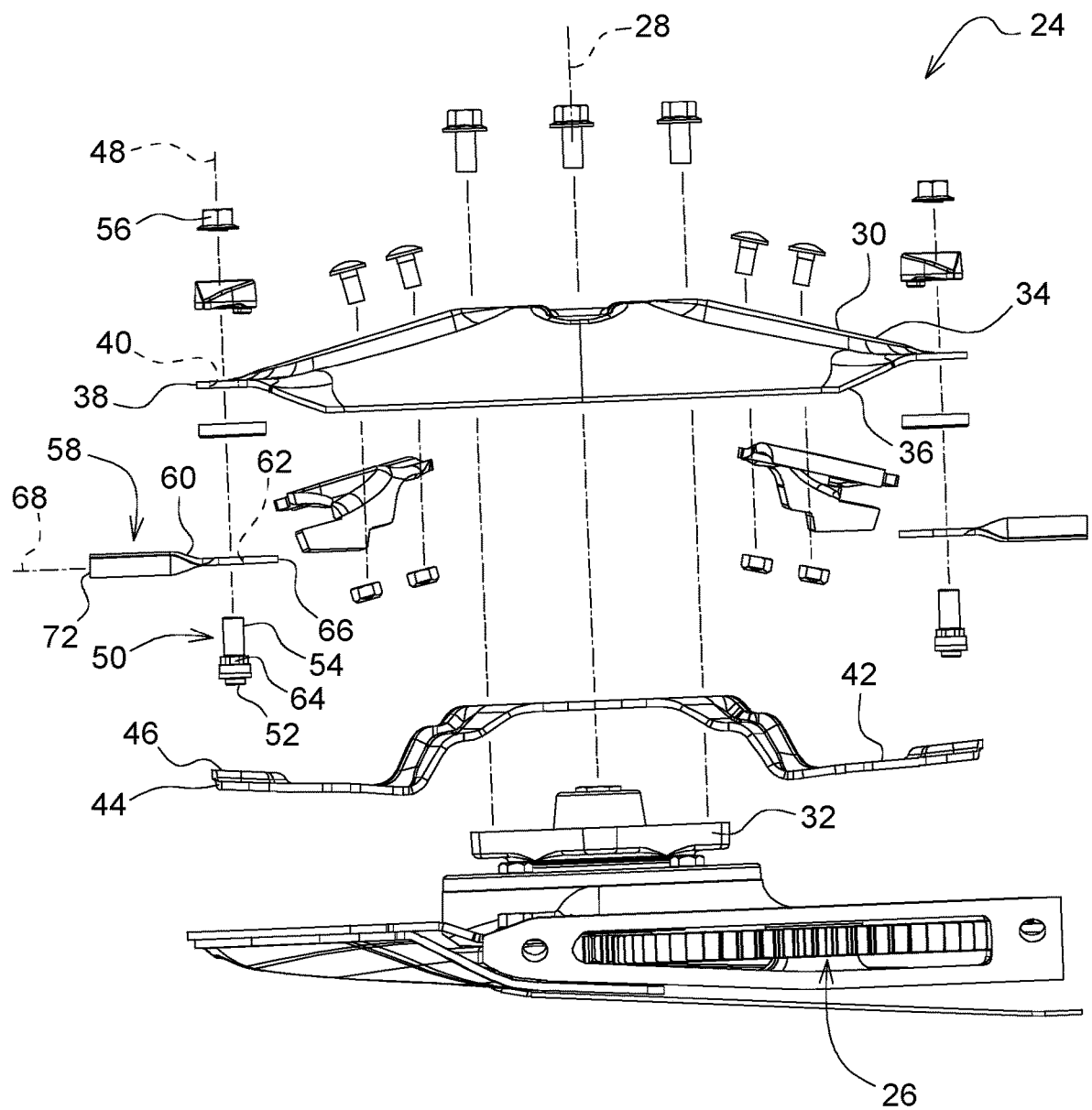
FIG. 4 is a schematic exploded cross-sectional view of the rotating blade assembly.
Figure 6:
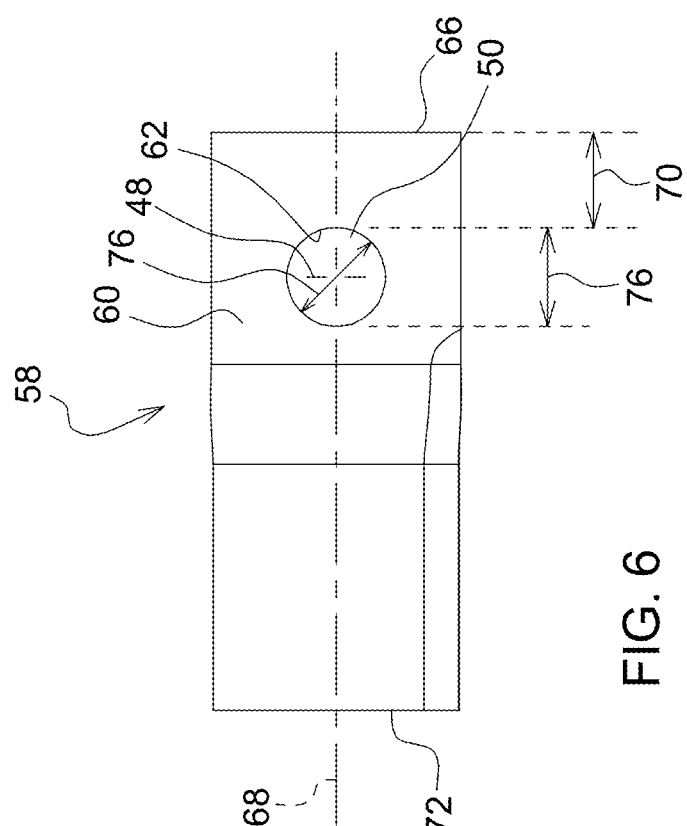
FIG. 6 is a schematic plan view of the blade and the retaining pin.
Figure 5:
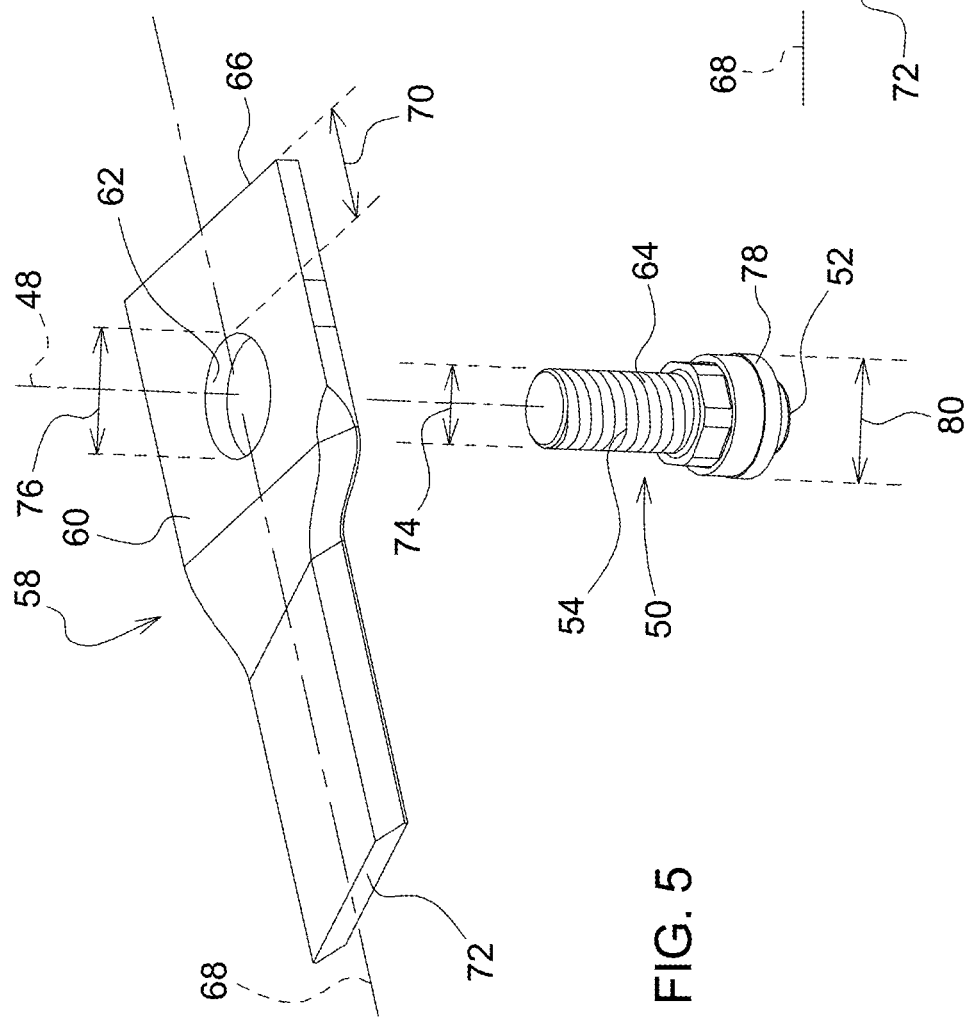
FIG. 5 is a schematic exploded perspective view of a blade and an associated retaining pin of the rotating blade assembly.
Figure 7:
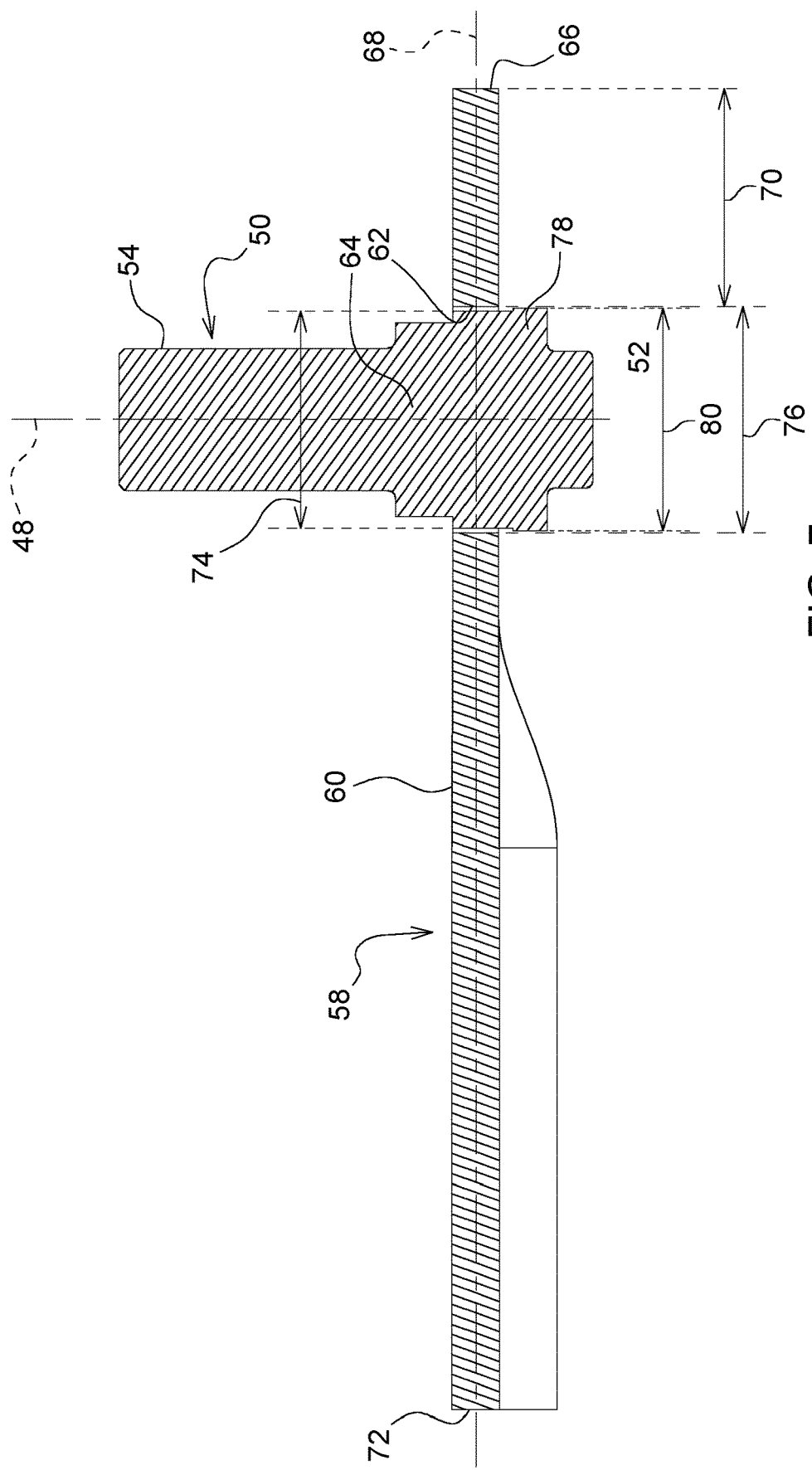
FIG. 7 is a schematic cross-sectional view of the blade and the retaining pin.

Referring to FIGS. 2-4, a rotating blade assembly 24 of the mower implement 20 is generally shown. While only a single rotating blade assembly 24 is shown in detail and described below, it should be appreciated that all of the rotating blade assemblies 24 of the mower implement 20 may be similarly constructed. The rotating blade assembly 24 includes a disc 30 that is drivenly attached to the drive mechanism of the cutter bar 22. For example, the disc 30 may be attached to a respective flange 32, which is in turn attached to and driven by the drive mechanism of the cutter bar 22. The disc 30 is driven by the drive mechanism of the cutter bar 22 for rotation about a respective rotation axis 28. The rotation axis 28 of the disc 30 extends generally orthogonal to platelike structure of the disc 30. In normal operation of the mower implement 20, in which crop material is cut, the disc 30 is arranged substantially parallel to a ground surface, with the rotation axis 28 of the disc 30 extending generally vertically.

The disc 30 includes a rigid, platelike structure having a first or upper surface 34, and a second or lower surface 36. The lower surface 36 is positioned toward the cutter bar 22, whereas the upper surface 34 is positioned away from the cutter bar 22. The platelike structure of the disc 30 is substantially inflexible. For example, the disc 30 may be manufactured from steel plate having a thickness and shape to prevent or limit deflection during operation. The example implementation of the disc 30 shown in the Figures and described herein includes the upper surface 34 and the lower surface 36 of the disc 30 defining a generally oval shape. However, it should be appreciated that the disc 30 may include some other shape not shown or described herein.

The disc 30 extends radially outward away from the rotation axis 28 to a radially outer disc edge 38. The disc 30 defines a mounting aperture 40 proximate the radially outer disc edge 38. In the example implementation of the disc 30 shown in the Figures and described herein, the mounting aperture 40 is positioned along a long dimension of the oval shape, near the radially outer disc edge 38. The mounting aperture 40 extends through the disc 30, in a direction substantially parallel with the rotation axis 28 of the disc 30.

A spring plate 42 is positioned between the cutter bar 22 and the lower surface 36 of the disc 30. The spring plate 42 is coupled to and rotatable with the disc 30. The spring plate 42 is coupled to the disc 30 proximate the rotation axis 28, and extends radially outward away from the rotation axis 28 to a radially outer plate edge 44. The spring plate 42 is not attached to the disc 30 adjacent to or near the radially outer plate edge 44. The spring plate 42 defines a pocket 46 disposed proximate the radially outer plate edge 44, and aligned with the mounting aperture 40 along a mounting axis 48. The mounting axis 48 is substantially parallel to the rotation axis 28 of the disc 30. In one implementation, the pocket 46 may include an aperture or bore that extends through the spring plate 42 in a direction parallel to the rotation axis 28 of the disc 30. In other implementations, the pocket 46 may include a recess or depression orientated with a concave shape facing the lower surface 36 of the disc 30.

The spring plate 42 is configured to exhibit a bias force at the pocket 46 in a direction toward the disc 30. The spring plate 42 may be manufactured from, but is not limited to, a spring steel or other similar material. As such, the spring plate 42 may exhibit some flexure. The bias force at the pocket 46 is directed in a direction that is substantially parallel with the rotation axis 28 of the disc 30, and generally perpendicular to the bottom surface of the disc 30.

A retaining pin 50 is engaged with the mounting aperture 40 of the disc 30 and the pocket 46 of the spring plate 42. The retaining pin 50 may be attached to one of the disc 30 or the spring plate 42, and disposed in abutting engagement with the other of the disc 30 and the spring plate 42. In the example implementation shown in the Figures and described herein, the retaining pin 50 is attached to the disc 30, and extends from the lower surface 36 of the disc 30 toward and into abutting engagement with the spring plate 42. A distal end 52 of the retaining pin 50 engages and/or is seated within the pocket 46. The retaining pin 50 may be attached to the disc 30 in any suitable manner. For example, the retaining pin 50 may include a threaded portion 54 that extends through the mounting aperture 40 of the disc 30, and which is threaded into a nut 56 positioned against the upper surface 34 of the disc 30. It should be appreciated that the retaining pin 50 may be attached to the disc 30 in some other manner not shown or described herein.

A blade 58 is positioned between the disc 30 and the spring plate 42. The blade 58 includes a body 60 defining a pin aperture 62. The pin aperture 62 extends through the body 60 of the blade 58 in a direction substantially parallel with the rotation axis 28 of the disc 30. The pin aperture 62 is substantially aligned with the mounting aperture 40 and the pocket 46 along the mounting axis 48.

The retaining pin 50 includes a shaft portion 64. The shaft portion 64 of the retaining pin 50 extends through the pin aperture 62 of the blade 58. With the distal end 52 of the retaining pin 50 engaged with the pocket 46, the bias force exerted by the spring plate 42 at the pocket 46 urges the spring plate 42 into engagement against the retaining pin 50, thereby securing the spring plate 42 relative to the retaining pin 50. With the retaining pin 50 attached to the disc 30, and the spring plate 42 biased against the distal end 52 of the retaining pin 50, the blade 58 is captured by the retaining pin 50 between the disc 30 and the spring plate 42.

The body 60 of the blade 58 includes a radially inner edge 66 relative to the rotation axis 28 of the disc 30. The radially inner edge 66 of the body 60 of the blade 58 may be defined as an axial end or longitudinal extent of the body 60 of the blade 58 measured along a central longitudinal axis 68 of the blade 58. In other words, the radially inner edge 66 of the body 60 is the edge of the body 60 of the blade 58 located nearest the rotation axis 28 of the disc 30. The body 60 defines a tail length 70 between the pin aperture 62 and the radial inner edge of the blade 58. The tail length 70 may be defined as the distance between a circumferential edge of the body 60 defining the pin aperture 62 that is positioned nearest the radially inner edge 66 of the body 60 of the blade 58. The tail length 70 may be further defined as the minimum radial distance relative to the rotation axis 28 of the disc 30 between the pin aperture 62 of the body 60 and the portion of the radially inner edge 66 of the blade 58 that contacts the spring plate 42 when a radially outer edge 72 of the body 60 is rotated toward the lower surface 36 of the disc 30.

In one aspect of the disclosure, the shaft portion 64 of the retaining pin 50 defines a shaft diameter 74. the tail length 70 is equal to or greater than seventy five percent (75%) of the shaft diameter 74 of the shaft portion 64 of the retaining pin 50. In one implementation, the tail length 70 is larger than the shaft diameter 74. In one particular implementation, the tail length 70 is approximately and/or substantially equal to zero point five (0.5%) greater than the shaft diameter 74 of the shaft portion 64 of the retaining pin. In other words, the tail length 70 approximately and/or substantially equal to 1.005 times larger than the shaft diameter 74.

The pin aperture 62 defines a hole diameter 76. In one aspect of the disclosure, the hole diameter 76 of the pin aperture 62 is larger than the shaft diameter 74 of the shaft portion 64 of the retaining pin 50. In one implementation, the hole diameter 76 of the pin aperture 62 is less than one point one (1.1) times the shaft diameter 74 of the shaft portion 64 of the retaining pin 50. In other words, the hole diameter 76 of the pin aperture 62 is less than one hundred ten percent (110%) of the shaft diameter 74 of the shaft portion 64 of the retaining pin 50. In one particular implementation, the hole diameter 76 of the pin aperture 62 is less than one hundred five percent (105%) of the shaft diameter 74 of the shaft portion 64 of the retaining pin 50.

The pin aperture 62 may be sized to be only slightly larger than the shaft diameter 74 of the shaft portion 64 of the retaining pin 50. As such, the hole diameter 76 of the pin aperture 62 and the shaft diameter 74 of the shaft portion 64 of the retaining pin 50 may be sized so as to provide minimal clearance, while allowing free rotational movement, between the body 60 of the blade 58 and the shaft portion 64 of the retaining pin 50. As such, in another aspect of the disclosure, the tail length 70 is substantially equal to or greater than seventy five percent (75%) of the hole diameter 76 of the pin aperture 62. As such, the tail length 70 may be larger than the hole diameter 76 of the pin aperture 62. In one particular implementation, the tail length 70 is substantially and/or approximately zero point five percent (0.5%) larger than the hole diameter 76 of the pin aperture 62.

The retaining pin 50 may include a flange 78 that extends radially outward away from the shaft portion 64 of the retaining pin 50. The flange 78 is positioned below the body 60 of the blade 58. As such, the shaft portion 64 of the retaining pin 50 radially contacts and engages the pin aperture 62 of the blade 58, with the flange 78 positioned below the body 60 of the blade 58. The flange 78 defines a flange diameter 80 that is greater than the shaft diameter 74 of the shaft portion 64 of the retaining pin 50. The flange diameter 80 is less than the hole diameter 76 of the pin aperture 62, such that the flange 78 may pass through the pin aperture 62. In one implementation, the flange diameter 80 may be less than one hundred five percent (105%) of the shaft diameter 74 of the shaft portion 64 of the retaining pin 50.

The greatest resistance against dislodgement of the blade 58 from the retaining pin 50 may be achieved with a longer tail length 70 than previously thought desirable. This is because the longer tail length 70 of the blade 58 described herein, in response to a force applied to the blade 58 in the direction of the rotation axis 28, positions contact between the blade 58 and the spring plate 42 nearer the rotation axis 28, which reduces a bending moment imparted into the spring plate 42 by the blade 58. Additionally, the longer tail length 70 of the blade 58 described herein requires the blade 58 to swing through a longer pivot arc to separate the spring plate 42 from the disc 30 far enough for the longer tail length 70 to be dislodged from the retaining pin 50. However, the tighter tolerance between the hole diameter 76 of the pin aperture 62 and the shaft diameter 74 of the shaft portion 64 of the retaining pin 50 reduces the available travel along the pivot arc, thereby reducing movement of the blade 58 relative to the retaining pin 50 and further increasing the resistance to dislodgement from the rotating blade assembly 24.

When the tail length 70 is sized according to the disclosure herein, the blade 58 will yield, i.e., bend, prior to the spring plate 42 flexing away from the disc 30 and allowing the blade 58 to dislodge from the retaining pin 50. Accordingly, the blade 58 configured according to the teachings described herein yields in response to a force applied in the direction of the rotation axis 28 prior to flexing the spring plate 42 away from the disc 30 a distance sufficient to allow the blade 58 to become dislodged from the retaining pin 50. As such, the blade 58 configured according to the teachings described herein provides a higher resistance to dislodgement from the spring plate 42 without changing the stiffness of the spring plate 42 and/or other components of the rotating blade assembly 24.

Because the stiffness or spring constant of the spring plate 42 may remain the same as prior art rotating blade assemblies 24, the same removal tool that was previously used to leverage the spring plate 42 away from the disc 30 may still be used, with the same required force, to change/replace the blade 58 from the rotating blade assembly 24. Additionally, the increased resistance against the blade 58 becoming disengaged from the retaining pin 50 may enable larger and/or heavier blades 58 than previously possible.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A rotating blade assembly for a mower implement, the rotating blade assembly comprising:
    a disc defining a rotation axis and extending radially outward away from the rotation axis to a radially outer disc edge, wherein the disc defines a mounting aperture proximate the radially outer disc edge;
    a spring plate coupled to the disc proximate the rotation axis and extending radially outward away from the rotation axis to a radially outer plate edge, wherein the spring plate defines a pocket aligned with the mounting aperture;
    a blade having a body defining a pin aperture and positioned between the disc and the spring plate;
    a retaining pin including a shaft portion extending through the pin aperture of the blade, wherein the retaining pin is engaged with the mounting aperture of the disc and the pocket of the spring plate, wherein the shaft portion of the retaining pin defines a shaft diameter;
    wherein the spring plate is configured to exhibit a bias force at the pocket in a direction toward the disc to capture the blade between the disc and the spring plate;
    wherein the body of the blade includes a radially inner edge relative to the rotation axis, with the body defining a tail length between the pin aperture and the radial inner edge;
    wherein the tail length is the minimum distance between a circumferential edge defining the pin aperture and the radially inner edge of the body of the blade; and wherein the tail length is equal to or greater than seventy five percent (75%) of the shaft diameter of the shaft portion of the retaining pin.

2. The rotating blade assembly set forth in claim 1, wherein the tail length is larger than the shaft diameter of the shaft portion of the retaining pin.

3. The rotating blade assembly set forth in claim 1, wherein the pin aperture defines a hole diameter that is larger than the shaft diameter of the shaft portion of the retaining pin.

4. The rotating blade assembly set forth in claim 3, wherein the hole diameter of the pin aperture is less than one hundred ten percent (110%) of the shaft diameter of the shaft portion of the retaining pin.

5. The rotating blade assembly set forth in claim 4, wherein the hole diameter of the pin aperture is less than one hundred five percent (105%) of the shaft diameter of the shaft portion of the retaining pin.

6. The rotating blade assembly set forth in claim 1, wherein the retaining pin includes a flange extending radially outward away from the shaft portion, wherein the flange defines a flange diameter that is greater than the shaft diameter.

7. The rotating blade assembly set forth in claim 6, wherein the flange diameter is less than one hundred five percent (105%) of the shaft diameter.

8. A blade for a rotating blade assembly of a mower implement, the blade comprising:
 a body including a radially inner edge and defining a pin aperture extending through the body;
 wherein the pin aperture defines a hole diameter;
 wherein an edge of the pin aperture positioned nearest the radially inner edge of the body is spaced from the radially inner edge by a tail length;
 wherein the tail length is the minimum distance between a circumferential edge defining the pin aperture and the radially inner edge of the body of the blade; and
 wherein the tail length is equal to or greater than seventy five percent (75%) of the hole diameter of the pin aperture.

9. The blade set forth in claim 7, wherein the tail length is larger than the hole diameter of the pin aperture.

10. A rotating blade assembly for a mower implement, the rotating blade assembly comprising:
 a disc defining a rotation axis and extending radially outward away from the rotation axis to a radially outer disc edge, wherein the disc defines a mounting aperture proximate the radially outer disc edge;
 a spring plate coupled to the disc proximate the rotation axis and extending radially outward away from the rotation axis to a radially outer plate edge, wherein the spring plate defines a pocket aligned with the mounting aperture;
 a blade having a body defining a pin aperture and positioned between the disc and the spring plate;
 a retaining pin including a shaft portion extending through the pin aperture of the blade, wherein the retaining pin is engaged with the mounting aperture of the disc and the pocket of the spring plate, wherein the shaft portion of the retaining pin defines a shaft diameter;
 wherein the spring plate is configured to exhibit a bias force at the pocket in a direction toward the disc to capture the blade between the disc and the spring plate;
 wherein the body of the blade includes a radially inner edge relative to the rotation axis, with the body defining a tail length between the pin aperture and the radial inner edge;
 wherein the tail length is the minimum distance between a circumferential edge defining the pin aperture and the radially inner edge of the body of the blade;
 wherein the tail length is larger than the shaft diameter of the shaft portion of the retaining pin; and
 wherein the pin aperture defines a hole diameter that is larger than the shaft diameter of the shaft portion of the retaining pin and wherein the hole diameter is less than one hundred ten percent (110%) of the shaft diameter of the shaft portion of the retaining pin.

\* \* \* \* \*